United States Patent [19]

Lindley

[11] 4,251,946
[45] Feb. 24, 1981

[54] SNAIL AND SLUG TRAP

[75] Inventor: Donald Lindley, Torrance, Calif.

[73] Assignee: Farnam Companies, Inc., Phoenix, Ariz.

[21] Appl. No.: 64,358

[22] Filed: Aug. 7, 1979

[51] Int. Cl.³ .............................................. A01M 1/20
[52] U.S. Cl. .................................................... 43/131
[58] Field of Search ...................... 43/131, 121, 132 R

[56] References Cited

U.S. PATENT DOCUMENTS

| 1,631,121 | 6/1927 | Eckl | 43/131 |
| 1,700,517 | 1/1929 | Ross | 43/131 |
| 1,856,200 | 5/1932 | Tippey | 43/131 |
| 1,964,611 | 6/1934 | Watson | 43/131 |
| 3,303,600 | 2/1967 | Freeman | 43/131 |
| 3,427,743 | 2/1969 | Brunner | 43/131 |
| 3,772,820 | 11/1973 | Bond | 43/131 |

Primary Examiner—Nicholas P. Godici
Attorney, Agent, or Firm—Posnack, Roberts, Cohen & Spiecens

[57] ABSTRACT

A trap particularly designed for snails and slugs is provided which includes a housing having multiple doorways to permit ready entry by the snails and slugs, which doorways are closable to permit easy disposal and shipment. The housing has a cover which provides an overhang over the doorways so as to prevent water entry from sprinklers or rain as well as to provide an inviting hiding place for snails and slugs. A pesticide is disposed in the housing as well as a dry bait attractant, the latter of which is activated by water from a water reservoir provided in the cover.

10 Claims, 4 Drawing Figures

“4,251,946”

SNAIL AND SLUG TRAP

BACKGROUND OF THE INVENTION

This invention relates to a snail and slug trap. More particularly, it relates to a snail and slug trap which provides an environmentally safe way of controlling snails and slugs.

In costal areas of the United States, snails and slugs are each one of the most destructive of garden pests and one of the most difficult to control. Snail and slug pesticides currently marketed are scattered on the ground around plants. While effective, this is an environmentally unsafe way of combating the problem since these pesticides are highly poisonous to pets, birds and animals, as well as humans who come into contact with it. Moreover, when spread around vegetable gardens there is a high risk of the poison contaminating the garden plants which could untimately lead to ingestion of the poison by the consumer of picked crops.

While various traps have been proposed to overcome this problem (see for example U.S. Pat. Nos. 3,303,600; 3,488,879; 3,550,308; 3,772,820; 3,987,607; and 4,035,946), so far as is known, no presently-available trap is as simple in construction and manner of use and yet as highly effective and environmentally safe as herein disclosed.

Accordingly, it is an object of the present invention to provide a novel trap for snails and slugs which is highly effective and yet environmentally safe.

It is also an object of the present invention to provide such a novel trap which is relatively simple in construction and easy to use.

It is a more particular object of the present invention to provide a novel trap having the foregoing attributes and characteristics which may be fabricated in an economical manner.

SUMMARY OF THE INVENTION

Certain of the foregoing and related objects are readily obtained in a trap which includes a hollow housing having a base wall surrounded by a preferably cylindrical side wall having at least one opening formed therein and a cover supported on the side wall which advantageously overhangs the opening. Means are also provided for closing the sidewall opening and a pesticide and a bait attractant are disposed in the housing.

Preferably, the means for closing the sidewall opening consists of a cylindrical closure having at least one opening formed therethrough which is slidably mounted on the sidewall for permitting movement of the opening thereof, into and out of alignment with the opening in the sidewall. Most advantageously, the bait attractant is disposed in a centrally-disposed bait well formed in the base wall of the housing and the pesticide comprises a dry granular material which is adhesively secured to the base wall so as to surround the bait attractant well.

In a preferred embodiment of the invention, the trap additionally includes means for supplying water to the bait well so as to activate the attractant disposed therein. Most desirably, such water supply means includes a water well formed in the cover having a dispensing aperture such as holes which the water drips thru to the attractant below.

In a particularly preferred embodiment of the invention, the bait attractant secured in the bait well, is composed of sugar and yeast premixed in a water soluable film pouch. The dry granular pesticide also advantageously comprises 3% metaldehyde and 5% Sevin by weight in edible base such as a grain flour. It is also advantageous to secure the soluable pouch within the well by means of a bait retaining cover.

DETAILED DESCRIPTION OF THE ILLUSTRATED AND PREFERRED EMBODIMENT

Figure 1:
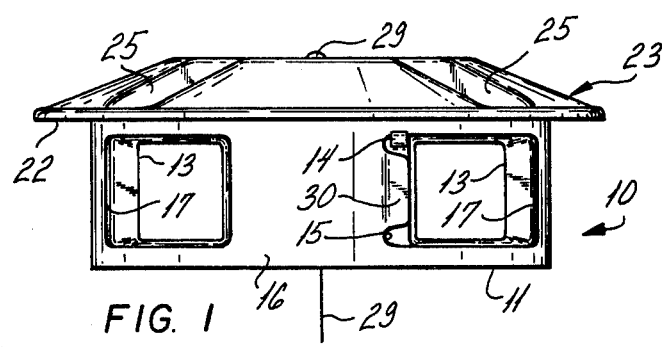
FIG. 1 is a side elevational view of a novel trap embodying the present invention.

Turning now in detail to the appended drawings, therein illustrated is a novel snail and slug trap embodying the present invention, which includes a hollow generally cup-shaped plastic housing 10. The housing 10 includes a horizontally-disposed generally circular base wall 11 and a cylindrical upstanding sidewall 12 having four, substantially rectangular, equidistantly spaced-apart openings 13 formed therethrough, adjacent to each of which is provided, adjacent to the top edge thereof, an outwardly projecting lug 14.

A cylindrical, plastic closure member 16 also having four, substantially rectangular and equidistantly spaced apart openings 17 formed therein, is telescopically and slidably supported on the outer surface of sidewall 12 by means of lugs 14, the upper edges of openings 17 resting and sliding upon lugs 14 so as to permit closure member 16 to be rotated back and forth between an open position (FIG. 1), in which its openings 17 are in registry with openings 13 of sidewall 12, and a closed position (not shown) in which openings 17 are disposed in an unaligned position relative to openings 13. This, in turn, of course, effects opening and closing of the trap. Preferably, openings 17 are provided with U-shaped cutouts 15 adjacent to the upper corners thereof which in the open and closed positions of the closure member 16, mate with lugs 14 to provide a more stable mounting.

In addition, it is preferable to provide a pull tab 30 on the lateral edge of at least one opening 17 so as to facilitate opening and closing.

Figure 2:
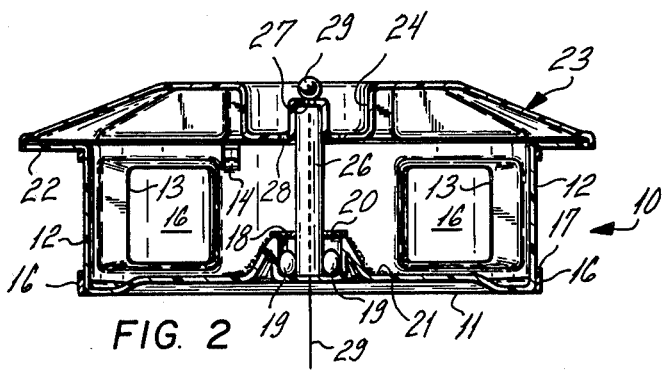
FIG. 2 is a cross-sectional view of the trap shown in FIG. 1.
Figure 3:
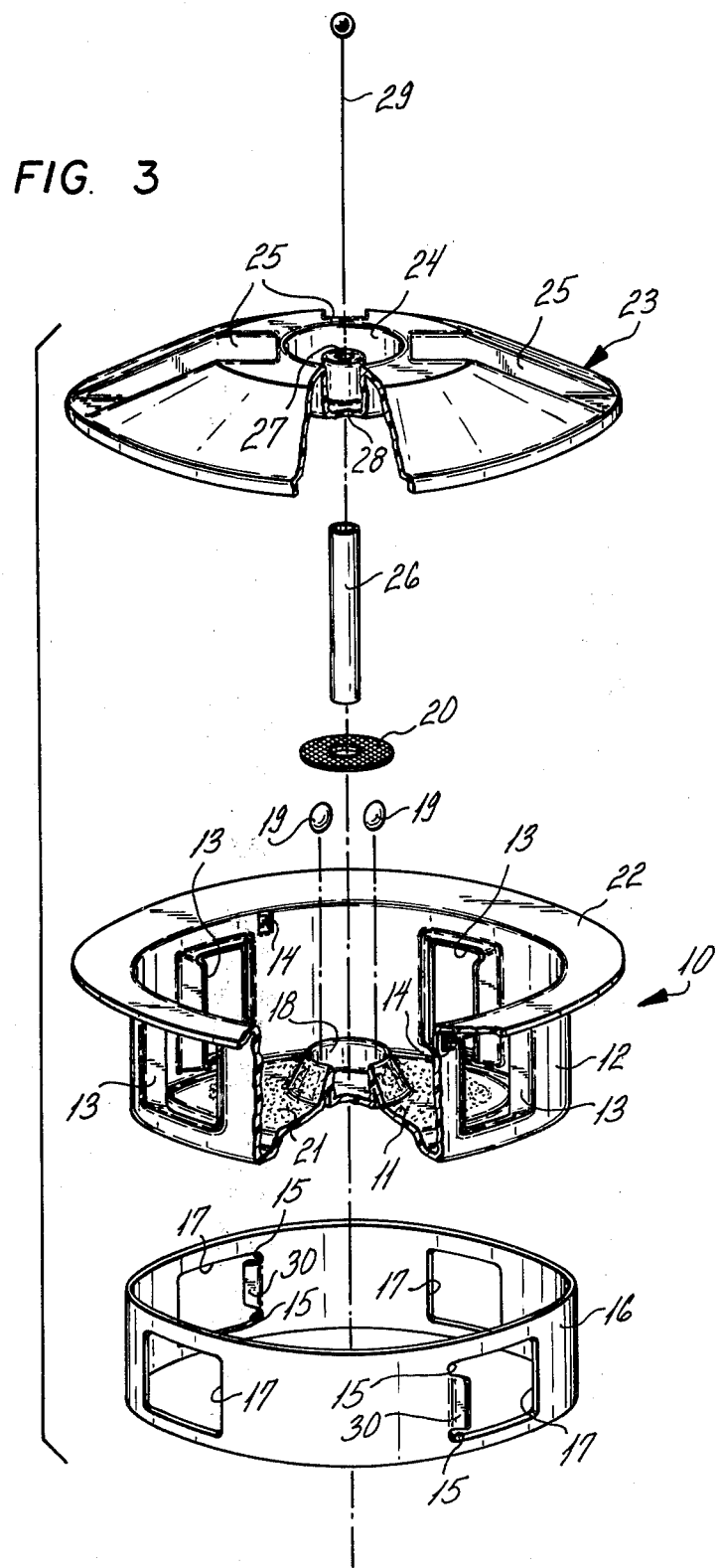
FIG. 3 is an enlarged, exploded, perspective view of the trap shown in FIGS. 1 and 2.

As can be seen in FIGS. 2 and 3, base wall 11 has a centrally-disposed bait well 18 in which a packet 19 containing an attractant is secured and covered by a retaining or security netting 20 completely surrounding the bait or attractant well. Adhesively secured to the downwardly-sloping portions of base wall 11 are dry pesticide granules 21.

Housing sidewall 12 has an upper, outwardly and radially extending flange 22 to which is secured a plastic cover or lid 23 having a generally frustoconical cross-section. Cover 23 is provided with a centrally-disposed water well 24 which serves as a metering means, and four spaced-apart radially-extending pick-up channels or grooves 25 which assist handling. Water well 24 in cover 23 is disposed directly over attractant well 18 in base wall 11. Openings 28 at the bottom of water well 24 permits water supplied from water well 24 to be gradually fed into bait well 18. A spike 29 is provided which may be passed through well aperture 27, tube 26 and base wall 11 so as to secure the trap in a desired location on a ground surface.

Thus, in operation, closure member 16 would slide into an open position relative to sidewall 12 and the trap would then be placed on the ground in the desired location and secured in place by means of spike 29. Then water well 24 would be filled with water so as to, in turn supply water to bait well 18. This will activate the attractant which will typically produce a scent to attract snails and slugs. So attracted, the snails and slugs will enter through openings 13 and be forced to cross over pesticide granules 21 before reaching the attractant. Netting 20 serving to secure the attractant in the well.

Once the slugs enter the trap, and eat the bait, they tend to stay in the trap, and as a result of their contact with the pesticide, die. After the trap is filled with dead snails and slugs, it can be closed and disposed of safely.

It should be noted that capsules of yeast in combination with capsules of sugar have been found to be extremely effective attractant. In addition, the pesticide disclosed in U.S. Pat. No. 3,313,684 has been found to be particularly effective. Especially effective is a pesticide which contains as active ingredients 3% metaldehyde and 5% Sevin.

It should be pointed out that the water well may advantageously be filled simply by means of rain or a sprinkler system; the overhang provided by cover 23 and flange 22 protecting the interior of the trap and providing a hiding place which would appear attractive to any snail or slug nearby.

Figure 4:
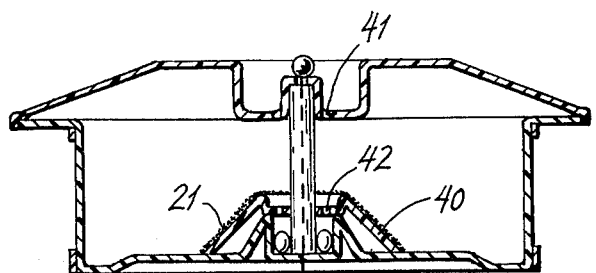
FIG. 4 is a cross-sectional view of an alternative embodiment of a trap.

An alternative construction is shown in FIG. 4 which under some circumstances may have production advantages. In this embodiment a separate cone shape plastic member 40 is coated with the pesticide 21. The coated member is then inserted into the housing. Thus the coating of the cones with pesticide may be accomplished in a plant adapted for safe handling of powdered pesticide. Without requiring handling of the complete product in said plant.

The soluable pouches or capsules are captured by the cone member 40. Openings 41 and 42 in the cover and cone shaped member 40 permit water to reach the water soluable capsules and the odor of attractant to waft out.

By way of example the parts of the trap may be vacuum formed of polystyrene sheet of the order of 0.020 inches thick and may be mass produced at extremely low cost. Accordingly it becomes economically feasible for it to be a disposable item.

As can be appreciated, many changes and modifications may be made as will be apparent to those skilled in the art without departing from the spirit and scope of the invention.

What is claimed is:

1. A trap comprising a hollow housing including a base wall, an upstanding sidewall secured to and surrounding said base wall, and an outwardly and radially extending flange on said sidewall, said sidewall having at least one opening formed therethrough, said housing also including a cover supported on said flange; means for closing said at least one opening; a pesticide disposed in said housing; a bait attractant disposed in said housing, said sidewall being cylindrical, said means for closing comprising a cylindrical closure having at least one opening formed therethrough which is rotatably mounted on said cylindrical sidewall for movement between an open position, in which it is aligned with said opening of said sidewall, and a closed position, in which it is moved into a non-aligned disposition relative to said opening of said sidewall, and a protrusion on said sidewall to engage with the opening in said closure to limit the displacement of the same.

2. The trap according to claim 1, wherein said cover extends outwardly beyond said sidewall and overhangs said opening.

3. The trap according to claim 1, wherein said base wall has a centrally-disposed bait well formed therein and wherein said bait attractant is disposed in said bait well.

4. The trap according to claim 3, wherein said pesticide is comprised of dry granular material which is bonded to said base wall and which is disposed to surround said bait well.

5. The trap according to claim 3, additionally including means for supplying water to said bait well so as to activate said attractant disposed therein.

6. The trap according to claim 5, wherein said means for supplying water includes a water well which is formed in said cover, having a dispensing aperture formed therethrough for supplying water from said water well to said attractant.

7. The trap according to claim 5, wherein said bait attractant comprises sugar and yeast in combination in a water soluable pouch.

8. The trap according to claim 4, wherein said dry granular material comprises 3% metaldehyde and 5% Sevin by weight.

9. The trap according to claim 7, additionally including a bait-retaining net disposed over said pouch in said bait well.

10. The trap according to claim 1, wherein said pesticide is disposed on a separate member positioned within said housing.

* * * * *